G. F. WILSON.
Fan Attachment.

No. 201,318. Patented March 12, 1878.

Attest:
August Petersohn
Jacob Brooks

Inventor:
George F Wilson,
by Louis Bagger & Co
Atty's.

UNITED STATES PATENT OFFICE.

GEORGE F. WILSON, OF ATHENS, TENNESSEE.

IMPROVEMENT IN FAN ATTACHMENTS.

Specification forming part of Letters Patent No. 201,318, dated March 12, 1878; application filed October 17, 1877.

*To all whom it may concern:*

Be it known that I, GEORGE F. WILSON, of Athens, in the county of McMinn, and State of Tennessee, have invented certain new and useful Improvements in Combined Dining-Table and Fly-Fan; and I do hereby declare that the following is a full, clear, and exact description thereof, which will enable others skilled in the art to which it appertains to make and use the same, reference being had to the accompanying drawings, which form a part of this specification, and in which—

Figure 1:
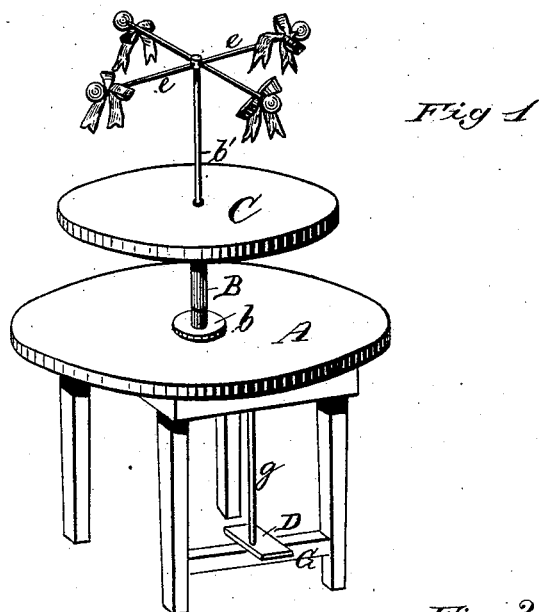
Figure 2:
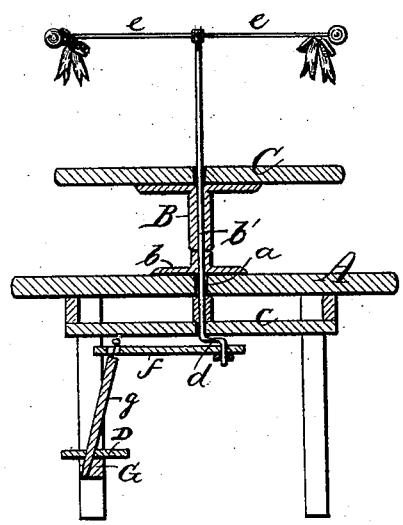

Figure 1 is a perspective view; and Fig. 2 is a vertical section.

Similar letters of reference denote corresponding parts in both the figures.

My invention relates to an improved dining-table, provided with a rotating disk, upon which dishes may be placed, so as to be brought readily before each guest, and a fly-fan attachment operated by a crank and treadle, all as I shall now proceed more fully to describe.

In the drawings hereto annexed, A is an ordinary round table of any suitable construction. It has a central perforation, $a$, covered by a perforated plate, $b$, which forms a bearing for a vertical shaft, $b'$. Another bearing for this shaft is formed by a cross-piece, $c$, uniting the sides of the table, and at its lower end the shaft $b'$ has a crank, $d$. The end of shaft $b'$, projecting upward above the table, passes through a tube, B, resting upon plate $b$, and supporting a circular leaf or disk, C, of less diameter than the table. The disk C may thus freely revolve independent of the shaft $b'$, which simply, by passing through tube B, aids in supporting it in position. The upper end of the shaft has cross-bars $e$ $e$ of wood or other suitable material, decorated or ornamented, when desired, and forming a fan, revolved with the shaft, which, when in operation, will keep the table free from flies and other obnoxious insects.

The fan is preferably operated by a pitman, $f$, connected to the crank $d$, and to the upper end of a reciprocating rod, $g$, secured to and projecting upward from a treadle, D. The latter is secured upon a cross-piece, G, pivoted between two legs of the table, in such a manner that it may be conveniently operated by one of the persons sitting at the table.

The operation and advantages of my invention will be readily understood from the foregoing description. The disk C, upon which the dishes are placed, may be readily rotated by hand, so as to bring any one dish in front of any one of the guests who wishes it. Being elevated above the table, it will not interfere with wine-glasses and other articles placed upon the table proper under it, and the annoyance of having the dishes crowded upon the table is completely obviated. Finally, the fly-fan may be easily operated at suitable intervals, or continuously, if desired, thus adding to the comforts of the guests while dining.

I am aware that it is not new to provide a self-waiting table with a fly-fan attachment. I do not, therefore, broadly claim such combination; but

Having thus described my invention, what I claim and desire to secure by Letters Patent of the United States, is—

1. The combination of the table A having perforation $a$ and perforated cross-piece $c$, perforated plate $b$, shaft $b'$, having arms $e$ $e$ and crank $d$, and operating mechanism $f$ $g$ D G, all constructed, arranged, and operating, substantially as described, for the purpose herein set forth.

2. The combination of the table A having perforation $a$, perforated plate $b$, tube B, rotating-disk C, and central rotating shaft $b'$, all constructed, arranged, and operating, substantially as described, for the purpose herein set forth.

In testimony that I claim the foregoing as my own I have hereto affixed my signature in presence of two witnesses.

GEORGE FRANKLING WILSON.

Witnesses:
JOHN F. HARRIS,
D. H. ROBERTS.